Dec. 21, 1926.

L. G. BURKWEST 1,611,264

ADJUSTABLE CONDENSER

Filed August 14, 1924

INVENTOR.
Leonard G. Burkwest
BY
ATTORNEY

Patented Dec. 21, 1926.

1,611,264

UNITED STATES PATENT OFFICE.

LEONARD G. BURKWEST, OF CHICAGO, ILLINOIS.

ADJUSTABLE CONDENSER.

Application filed August 14, 1924. Serial No. 732,042.

This invention relates to improvements in adjustable electric condensers, and while the invention may be applied in any circuit where an adjustable condenser is indicated, it is particularly applicable, by reason of its compactness and of the minute and uniform adjustments of the condenser elements, to the circuits of radio receiving sets.

The principal object of the invention is to produce a novel adjustable condenser in which the variation of capacity can be effected by flexing the condenser plates one toward the other, and characterized further in the fact that when the condenser is adjusted to its lowest capacity the movable plate is farthest removed from the other plate and is insulated by an adjustable air gap and a fixed dielectric, so that when the end of the movable plate is brought towards and against the dielectric the increasing capacity of the condenser is effected, first, by causing the movable plate to advance towards the dielectric and the other plate at an angle producing a wedge-shaped space, which space assumed a closed wedge-shape when the movable plate contacts with the dielectric, and, second by causing the flexible plate, during continued advancement of the movable plate towards the other plate, gradually to decrease the length or depth of the V-shaped space separating the movable and other plate with the dielectric interposed therebetween until said angle between the movable and the dielectric vanishes, or substantially so, at the point of largest capacity of the condenser where the plates are substantially parallel with each other. Conveniently, and as herein shown, the total movement to vary the capacity of the condenser is effected by the movement of one flexible plate towards the dielectric that lies on another fixed plate, but this relative movement of the plates may within the spirit of the claims hereto attached be manifested by movement of both plates towards each other by suitable means which will bring the plates into parallelism, with one plate flat on the dielectric when the condenser is adjusted to its largest capacity.

The utility of this arrangement of the plates and dielectric is manifested in that the movable plate in the lowest capacity of the condenser is spaced at the greatest distance over its entire length, within the limits of the condenser, from the other plate by a body of air and the fixed dielectric, and the fact that this body of air, upon approach of the end of the movable plate towards the dielectric, is gradually lessened in its characteristic of a dielectric until the other end of the movable flexible plate is brought into contact with the dielectric, and thereafter the V-wedge shaped space formed between coacting movable condenser plate and dielectric is gradually decreased and vanishes when the movable plate approaches parallelism with the dielectric of the other plate, thereby imparting to the condenser a uniform increased capacity when moving in one direction, and a decreased capacity when moving in the opposite direction.

A further and important object of the invention is to produce a condenser of this general type wherein that one of the condenser plates which is relatively movable towards the other condenser plate and dielectric is pointed or sharpened at its free end or the first point of contact of the plate with the dielectric.

It is desirable that the change in capacity be practically uniform throughout the range of adjustment of a condenser of this kind. The purpose of making the movable plate pointed at its free end is to avoid an abrupt change in capacity at the moment that the point comes in contact with the dielectric, and therefore the change in capacity of the condenser takes place at a substantially uniform rate throughout the entire range of adjustment of the condenser.

As before stated, one of the plates may be fixed, and the other movable towards it, or both plates may be movable towards each other, and either of the plates may carry the dielectric within the scope of the appended claims.

Other objects of the invention are to otherwise simplify and improve adjustable condensers, and the invention comprises the elements and combination of elements shown in the drawings and described in the specification, and is pointed out in the appended claims.

Referring now to one embodiment of the invention illustrated in the drawing.

In the construction herein illustrated, one of the condenser plates is fixed, and the other is movable towards and from the fixed plate, the dielectric in this instance being superposed on the fixed plate.

In said drawings, 2 designates the fixed plates of the condenser, and 3 the movable plate thereof. The fixed plate is in this embodiment of uniform width, while the movable plate is provided with a pointed free end 3'. The movable plate is made of a strip of flexible electric conducting material. At the base of its point 3', it is preferably made of the same width as the fixed plate. The said movable plate is suitably anchored in the casing and extends therefrom for connection with a conductor in a circuit in which the condenser is included. The fixed plate 2 likewise extends from its support or casing for connection in its circuit.

Figure 2:
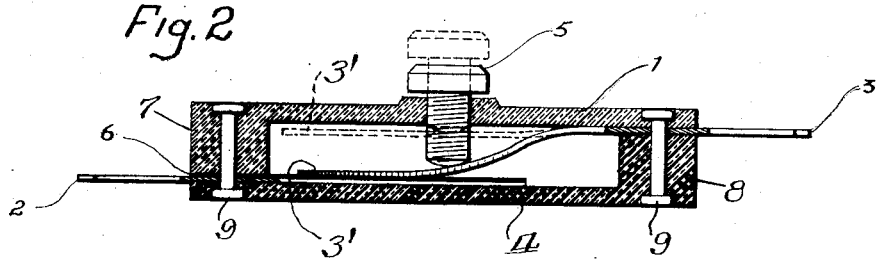
Figure 2 is a vertical section on the line $x$—$x$ of Figure 1.

When the condenser is adjusted for its smallest capacity, it assumes the position indicated in dotted lines in Figure 2, being in line with its anchor end.

Any suitable means may be employed in the embodiment shown for moving the free end 3' of the plate towards the dielectric 6 which is superposed on the plate 2. The active moving means herein shown comprises a screw 5 which may be threaded through a fixed abutment, as a casing wall, in which the condenser elements are enclosed, and engages at its inner end with that part of the condenser plate 3 near the base of its pointed end 3'. When the free end of the conductor 3 occupies the position indicated in dotted lines in Figure 2, it is separated from the plate 2 by the dielectric and air gap between the dielectric and the free end of said movable plate. Pressure applied to the movable plate through the action of the screw 5, or other equivalent adjusting means has the effect to gradually decrease the angle of the free end of the movable plate relatively to the fixed plate and thus decrease capacity between the free pointed end of the movable plate and the plate 2.

When the free end of the plate 3 strikes the dielectric 6, said free end is caused to be flexed in the manner shown in full lines in Figure 2, the flexation occurring in the theretofore angle portion of the free end of the movable member. As pressure is increased on said movable plate, the latter plate will flex beginning at its point, and this flexation will continue as the pressure is continued until the wedge-shaped body of air is eliminated between the flexing movable plate and the dielectric, whereupon said plates are parallel with each other and with the dielectric between them, thus producing the greatest amount of capacity for which the condenser is adapted.

Figure 1:
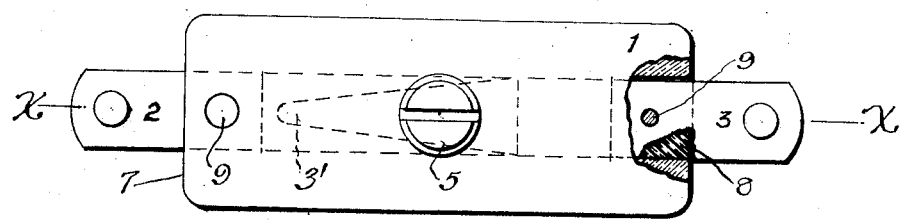
Figure 1 is a plan view of a variable condenser embodying my invention.
Figure 3:
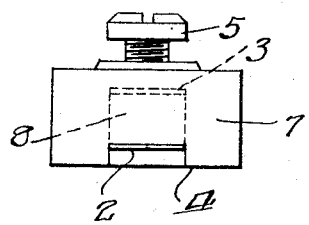
Figure 3 is an end view of the condenser.

Many forms of casings to support and enclose the condenser elements may be provided. I have herein shown a simple two part casing made of insulating material consisting of separately made top wall 1 and bottom wall 4. Each wall 1 and 4 is formed at one end with right angle extensions 7, 8 which, respectively, bear against the relatively opposite ends of the walls 1 and 4; and the parts of the casing thus formed are joined together by rivets 9. The lower wall 4 of the casing is of less width than the total width of the lower side of the casing, as shown in full lines in Figure 3 and dotted lines in Figure 1, and the condenser plates 2 and 3 are clamped between their respective right angle portions 7, 8 and the inner faces of the straight portions of said walls, as best shown in Figure 2. The lower wall member 4 is spaced from the right angle extension 7 of the upper wall, and the right angle extension 8 of the lower wall is spaced from the inner face of the upper wall a distance to clamp the condenser plates between the casing members. The extension 8 constitutes in effect a fulcrum by which the movable condenser element is anchored whereby the first point of flexation of said condenser plate 3 is a distance inwardly from said extension 8, as indicated in Figure 2.

The casing for supporting and enclosing the dielectric parts has been described as indicating a suitable casing for this purpose, but it is intended that the description of a practical casing is intended to be illustrative and not limitative.

The condenser above described has been found in practice to be exceedingly uniform in its variations of capacity, and is well adapted to current of low value such as are used in radio receiving sets. While the condenser has been constructed for low current, it will be understood that the principles thereof may be advantageously employed in circuits carrying higher value current.

I claim as my invention:

1. An adjustable electric condenser comprising a plurality of opposing plates and an interposed dielectric, characterized in that one of the plates is flexible, anchored and free-ended, and that pressure is applied to the flexible plate between its free end and its anchored part to bring its free end into proximity to the other plate and to the dielectric and then cause it progressively to be flexed into proximity to the other plate and to the dielectric from its free end toward the anchored part.

2. An adjustable condenser comprising a plurality of plates spaced apart from each other, one of the plates being flexible, anchored and free-ended, and means for manipulating the flexible plate so as to cause its free end to be brought into proximity to the other plate and then to be bent progressively from the free end toward the anchored part to lay it in proximity to the other plate.

3. An adjustable electric condenser, comprising a plurality of opposing plates and an interposed dielectric, characterized in that one plate is anchored and free ended and that pressure is applied thereto between its free end and anchored part to vary its engagement with and angularity to the dielectric, and thereby vary the capacity of the condenser, the free end of one plate being sharply pointed and tapering gradually back to its greatest width, and means whereby pressure first causes point contact between said pointed plate and said dielectric and thus producing V angle between it and the dielectric, and whereby continued pressure causes said angle to disappear and bring said plates to parallelism.

4. An adjustable condenser comprising two parallel plates spaced a considerable distance apart from each other, one end of one of the plates being fixed with respect to the corresponding end of the opposite plate and its other end being free, a dielectric interposed between said plates, and means for flexing the latter plate free end first into proximity to the other plate and then progressively flattening it so as to lay the greater portion thereof in proximity to the other plate.

5. An adjustable condenser comprising a plurality of plates spaced apart from each other, one of the plates being flexible, one end of the flexible plate being spaced in fixed relation to the other plate and the other end of the flexible plate being free, and means for manipulating the flexible plate so as to cause its free end to be brought into proximity to the other plate and then to cause a considerable length of the flexible plate to be laid flat in proximity to the other plate.

In testimony whereof I claim the foregoing as my invention, I hereunto append my signature this 13th day of August, 1924.

LEONARD G. BURKWEST.